United States Patent
Duchon et al.

(10) Patent No.: US 6,529,267 B1
(45) Date of Patent: Mar. 4, 2003

(54) METHOD FOR ACQUIRING AN IMAGE BY OVERSAMPLED PUSH-BROOM SCANNING

(75) Inventors: Paul Duchon, Venerque (FR); Alain de Leffe, Toulouse (FR); Marc Pircher, Odars (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/214,703

(22) PCT Filed: May 12, 1998

(86) PCT No.: PCT/FR98/00942

§ 371 (c)(1),
(2), (4) Date: Jun. 25, 1999

(87) PCT Pub. No.: WO98/52348

PCT Pub. Date: Nov. 19, 1998

(30) Foreign Application Priority Data

May 12, 1997 (FR) .............................. 97 05766

(51) Int. Cl.[7] ........................... H04N 3/15; G01C 11/02
(52) U.S. Cl. ............................................ 356/2; 358/145
(58) Field of Search ............................... 256/2; 378/144, 378/145, 147

(56) References Cited

U.S. PATENT DOCUMENTS

| | | | |
|---|---|---|---|
| 4,802,757 A | * | 2/1989 | Pleitner et al. ............... 356/2 |
| 5,104,217 A | * | 4/1992 | Pleitner et al. ............... 356/2 |
| 6,215,522 B1 | * | 4/2001 | Rouge et al. ............... 348/145 |

FOREIGN PATENT DOCUMENTS

| | | | |
|---|---|---|---|
| EP | 0 027 168 A | 4/1981 | ............ G01C/11/02 |
| EP | 0 383 114 A | 8/1990 | ............ G05D/1/08 |
| EP | 0 510 269 A | 10/1992 | ............ H04N/3/08 |
| FR | 2 595 817 A | 9/1987 | ............ G01C/11/00 |
| FR | 2 737 376 A | 1/1997 | ............ H04N/3/15 |

* cited by examiner

*Primary Examiner*—Richard A. Rosenberger
(74) *Attorney, Agent, or Firm*—Connolly Bove Lodge & Hutz LLP

(57) ABSTRACT

The invention concerns a method for acquiring an image by oversampled push-broom scanning from a satellite-borne vehicle or aircraft carrying at least a load transfer sensor bar, characterised in that it consists in controlling the attitude and the vehicle rolling, pitching and yawing angular speeds such that the longitudinal and lateral ground speeds of the bar verify: (a), (b) in which $V_{ref}$=P/Ti, P being the bar ground step, Ti the sampling period, and m and l two whole numbers.

5 Claims, 3 Drawing Sheets

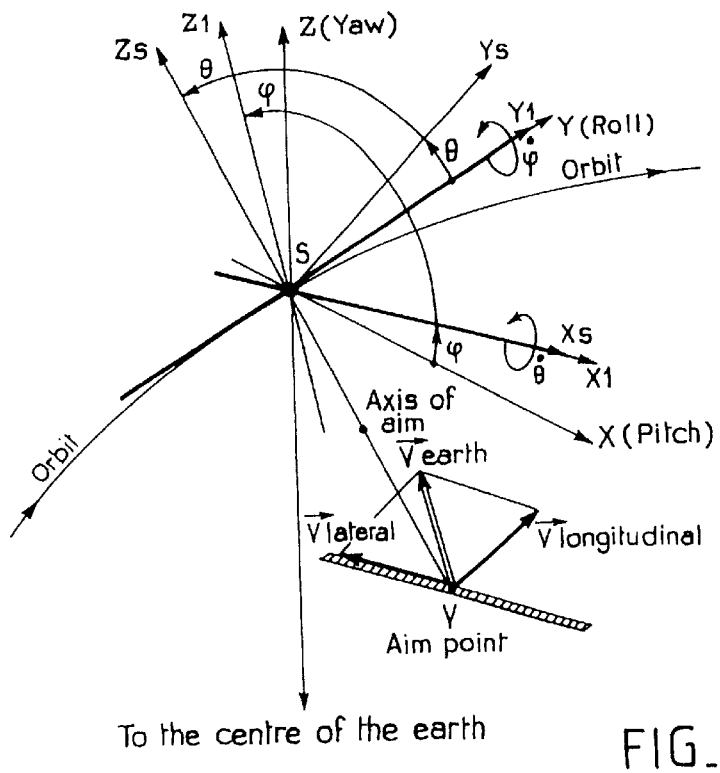
FIG_1
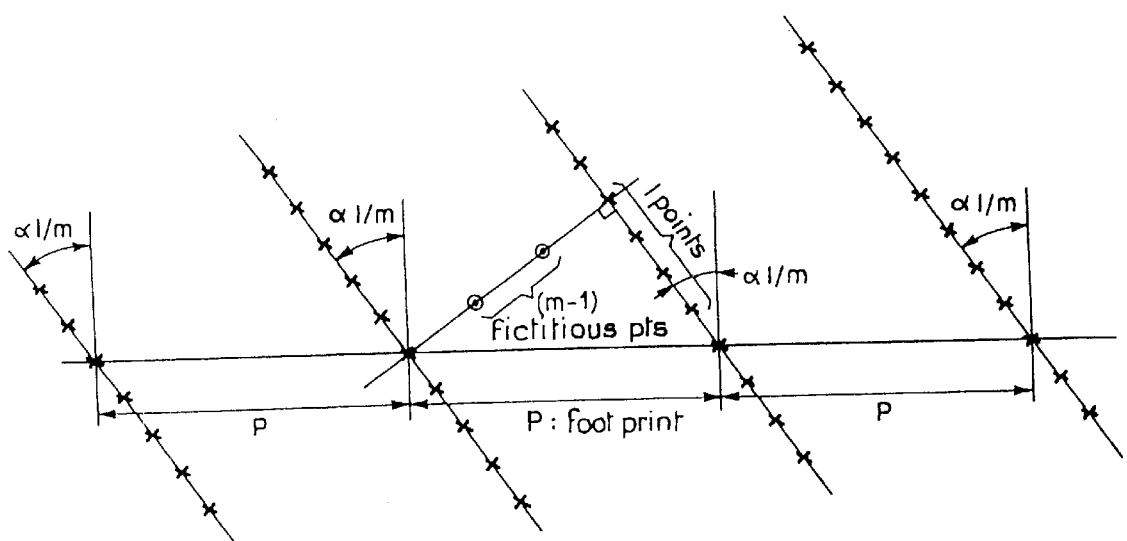
FIG_2

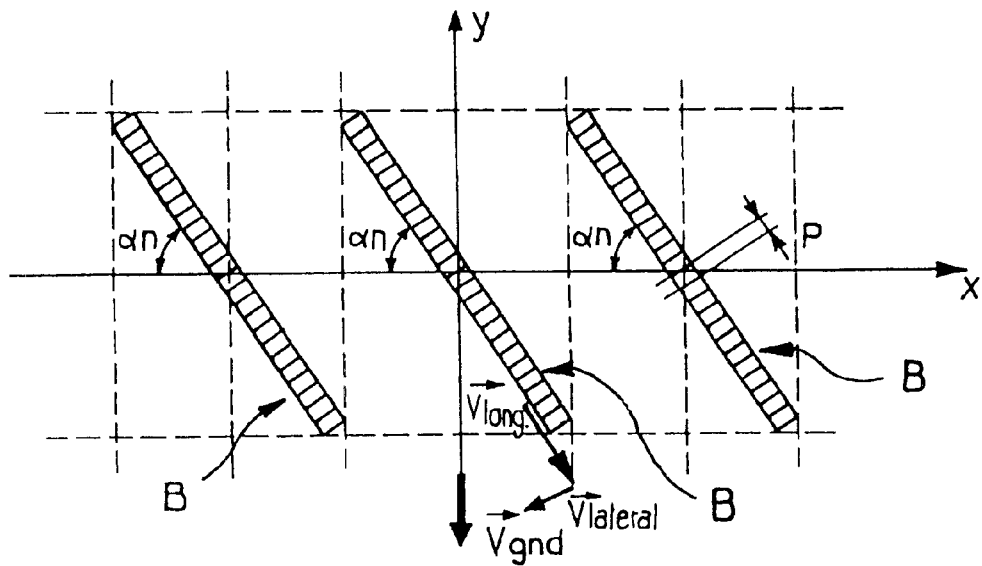
FIG_5
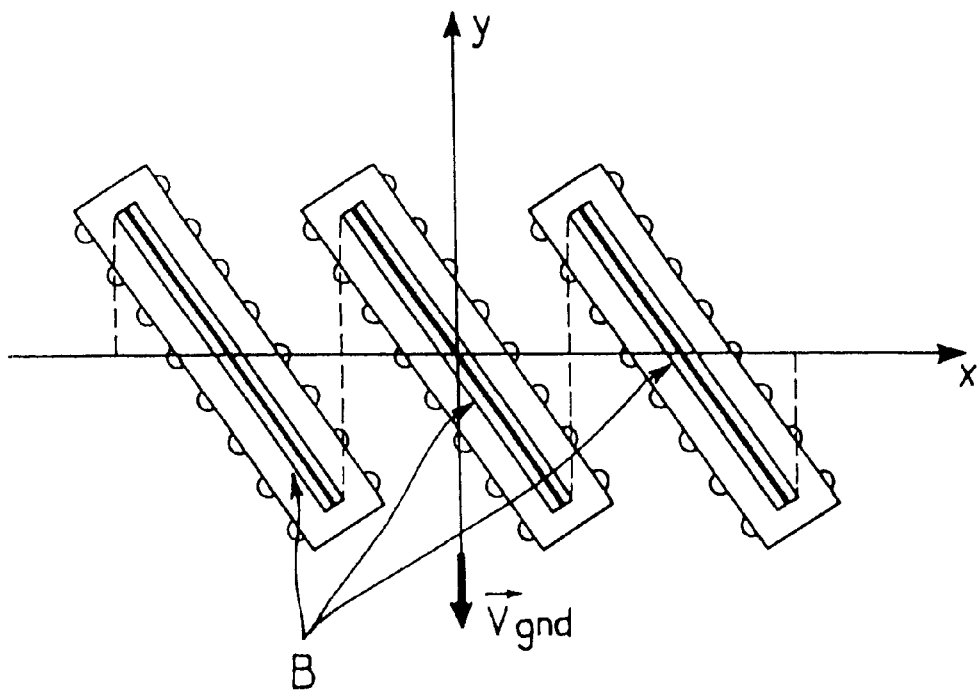
FIG_6

METHOD FOR ACQUIRING AN IMAGE BY OVERSAMPLED PUSH-BROOM SCANNING

The present invention relates to a process for acquiring an image by "push-broom" scanning by at least one array of sensors of the charge coupled type CCD travelling past the observed area.

The invention advantageously finds application to the satellite observation of the earth or else to observation from aerial vehicles (airplane, drone, etc).

The Applicant has already proposed, in their patent application FR 95 09263, a process for acquiring images by means of arrays or matrices of CCD sensors, according to which the array or matrix is oriented with respect to the direction of movement in such a way as to carry out an oversampling while attenuating the effects of the spectral aliasing.

An object of the invention is to propose an acquisition which makes it possible to achieve finer samplings.

To this end, it proposes a process for acquiring an image by push-broom scanning from a satellite or aerial vehicle carrying at least one array of sensors of charge coupled type, characterized in that the attitude and the angular rates of roll, pitch and yaw of the vehicle are controlled so that the longitudinal and lateral ground speeds of the array satisfy $$V_{Longi} = \pm \frac{m}{m^2 + l^2} \cdot V_{ref}$$

$$V_{lateral} = \pm \frac{l}{m^2 + l^2} \cdot V_{ref}$$

where $V_{ref}=P/T_i$, P being the footprint of the array, Ti the sampling period, m and l two integers.

Other characteristics and advantages of the invention will emerge further from the description which follows. This description is purely illustrative and non-limiting. It should be read in conjunction with the appended drawings in which:

FIG. 1 is a diagrammatic representation of the ground image of an array of CCD detectors moving relative to a frame tied to the earth, and in which the angles of role, pitch and yaw of the vehicle which transports the said array have been marked;

FIG. 2 is a diagrammatic representation illustrating a sampling obtained with an array in which the angle between the normal to the said array and the ground speed of the centre of the image of said array is αn;

Figure 3:
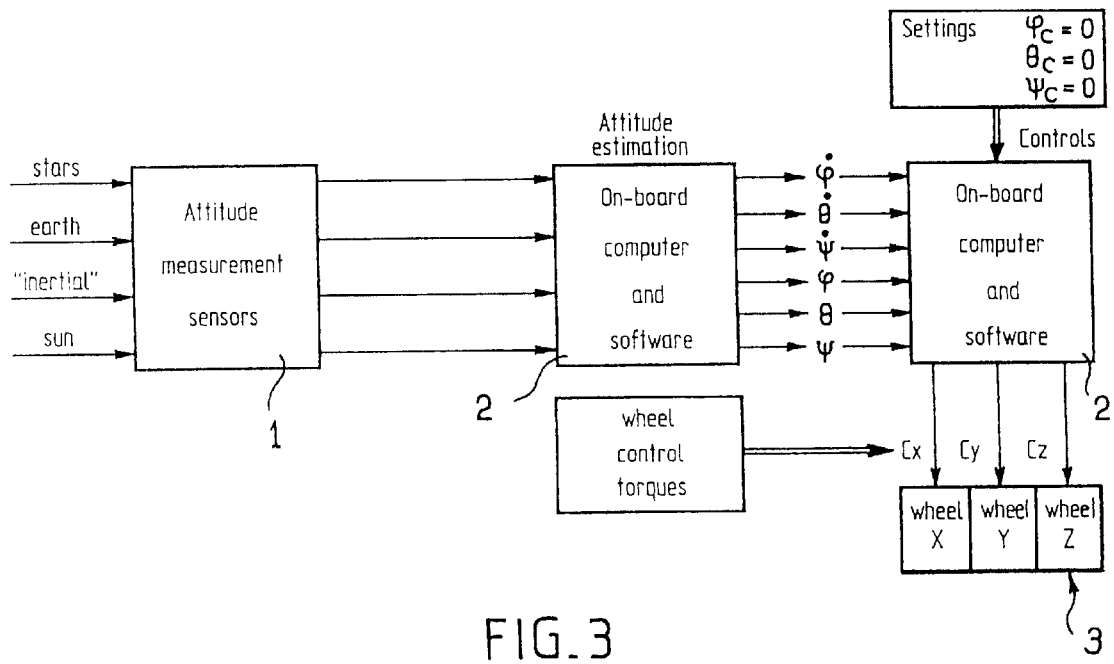
FIGS. 3 and 4 are block diagram representations of the device means in accordance with two particular embodiments of the invention allowing acquisitions of the type illustrated in FIG. 2.

FIG. 5 diagrammatically represents an array arrangement which is advantageous for the implementation of the invention;

FIG. 6 illustrates a possible embodiment with such an arrangement.

In FIG. 1, S denotes the satellite carrying the acquisition array, X, Y, Z the local orbital frame whose centre S coincides with the centre of mass of the satellite, Vsat and Vgnd the vectors corresponding to the absolute velocity of the point of aim of the array and to the relative velocity of this image of the array with respect to the ground.

In this example, the acquisition array (or arrays) are arranged in the conventional manner in the focal plane of an optic, with or without a change of aim mirror (if the instrument possesses a change of aim mirror, the latter will be stationary at the moment of image capture; if the whole instrument can rotate with respect to the satellite at the moment of image capture, this instrument will remain stationary at the moment of image capture).

The angles of roll, pitch and yaw have been respectively labelled $\phi$, $\theta$ and $\psi$; the corresponding angular velocities by $$\dot{\phi}, \dot{\theta} \text{ and } \dot{\psi}.$$

In most earth observation satellites, the body of the vehicle is locked on to the local orbital frame. A system of mirrors makes it possible to orient the axis of aim so as to provide access to the maximum possible areas.

The velocity Vgnd is the difference between the velocity $\vec{V}$sat and the velocity $\vec{V}_{earth}$ induced by the rotation of the earth ($\vec{\Omega}_{earth} \wedge C\vec{V}$ with C at the centre of the earth).

More particularly, $$\vec{V}\text{gnd} = \vec{V}\text{sat} - \vec{V}\text{earth} + \vec{\psi} \wedge S\vec{V}$$

where $\vec{V}$ denotes the point of aim on the earth and $\vec{\psi}$ the absolute angular velocity of the satellite S, assuming the axis of aim to be tied and fixed to the satellite.

According to the invention, the angular rates of roll, pitch and yaw of the satellite are controlled so as to produce a sampling of the type illustrated in FIG. 2, in the case of an angle of ground slip of the array such that:

$$\alpha_{1/m} = \text{Arctan } 1/m,$$

the longitudinal and lateral ground speeds of the array being given by:

$$V_{Longi} = \pm \frac{m}{m^2 + l^2} \cdot V_{ref}$$

with $V_{ref} = P/T_i$ $$V_{lateral} = \pm \frac{l}{m^2 + l^2} \cdot V_{ref}$$

where P is the footprint of the array, $T_i$ the sampling period and m and l are integers. In FIG. 2, the crosses represent the ground images of the centres of the detectors at each sampling instant t+kTi, with k an integer and t a given sampling instant.

In particular, if m=1 and l=n, with n an integer, a so-called "integer supermode" sampling is obtained with ground images of the centres of detectors distributed over an orthonormal grid. Such a sampling has the advantage of having a reduced footprint and swish pan effect.

By way of example, the table below gives the characteristics of several possible "integer supermode" samplings.

TABLE

| Super-mode No. (n) | Effective "footprint" Pn | Angle αn | Ground speed Longitudinal | Ground speed Lateral | Field of view under the track Cn* |
|---|---|---|---|---|---|
| 1 | P/√2 | Arctan1 = 45° | ±Vref/2 | ±Vref/2 | 42.4 km |
| 2 | P/√5 | Arctan2 = 63° .435 | ±Vref/5 | ±2Vref/5 | 26.8 km |

TABLE-continued

| Super-mode No. (n) | Effective "foot-print" Pn | Angle αn | Ground speed Longi-tudinal | Lateral | Field of view under the track Cn* |
|---|---|---|---|---|---|
| 3 | $P/\sqrt{10}$ | Arctan3 = 71°.565 | ±Vref/10 | ±3Vref/10 | 18.9 km |
| 4 | $P/\sqrt{17}$ | Arctan4 = 75°.964 | ±Vref/17 | ±4Vref/17 | 14.5 km |
| ... | ... | ... | ... | ... | ... |
| N | $P/\sqrt{n^2+1}$ | Arctan(n) | $\pm Vref/n^2+1$ | $\pm nVref/n^2+1$ | Ccosαn |

*For a 60 km field in the normal mode of image capture under track (SPOT 1, 2, 3 and 4).

When the case of integer supermode type sampling does not hold, we then speak of "fractional supermode" sampling.

This type of sampling has numerous advantages.

It makes it possible not to use double arrays, the technology of which is specific to the need of earth observation by satellite. It is therefore less expensive.

Likewise, it has great flexibility of use. In particular, for a satellite and a given optical observation instrument (fixed and/or already in orbit) it makes it possible to programme image captures which give improved image resolution (after appropriate processing).

Likewise, it also makes it possible to programme "image capture strips" tilted with respect to the suborbital track of the satellite (or the direct ground track of the aeroplane or drone), which may be of benefit in the quasi-simultaneous capture of images which are greatly offset laterally.

Overall, these "supermodes" make it possible to increase the performance in terms of resolution and access of an existing earth observation satellite or one under development; they provide additional possibilities and system flexibility.

For example, in the SPOT1 satellite in orbit since February 1986, the resolution of which is 10 m×10 m, it is possible with the solution proposed by the invention to perform acquisitions with footprints of 4.5 m×2.25 m (with l=4 and m=2) or even 2.4 m×2.4 m (with l=4 and m=1).

By way of example, the angular rates of roll and pitch ($\dot\phi$ and $\dot\theta$) can be computed with a constraint imposing a zero angle of yaw ($\psi=0$), these rates being calculated from the velocities $\vec{V}_{longi}$ and $\vec{V}_{lateral}$ corresponding to the desired sampling.

As a variant, an angle of slip which differs from the value corresponding to the supermode carried out at zero yaw can be obtained with a yaw rotation.

By way of example, in the case of a satellite with geocentric pointing, means of the type illustrated in FIG. 3 can be used to carry out sampling at zero angle of yaw.

These means comprise means 1 for measuring attitude which consist, for example, of star trackers, earth trackers, gyroscopes or sun trackers.

They also use the on-board computer 2 of the satellite which, on the basis of the measurements made by the aforesaid means, makes an estimate of the attitude of the satellite and determines the actual values of the angles and angular rates of pitch, yaw and roll.

By setting prescribed values, for example on the attitude angles and/or the angular velocities, the on-board computer calculates commands intended to be applied to the attitude actuators 3.

The actuators 3 are reaction wheels on which torques $C_x$, $C_y$ and $C_z$ are imposed, these wheels corresponding to the three axes of the satellite. These wheels must be de-glazed continuously or regularly by magneto-couplers.

Figure 4:
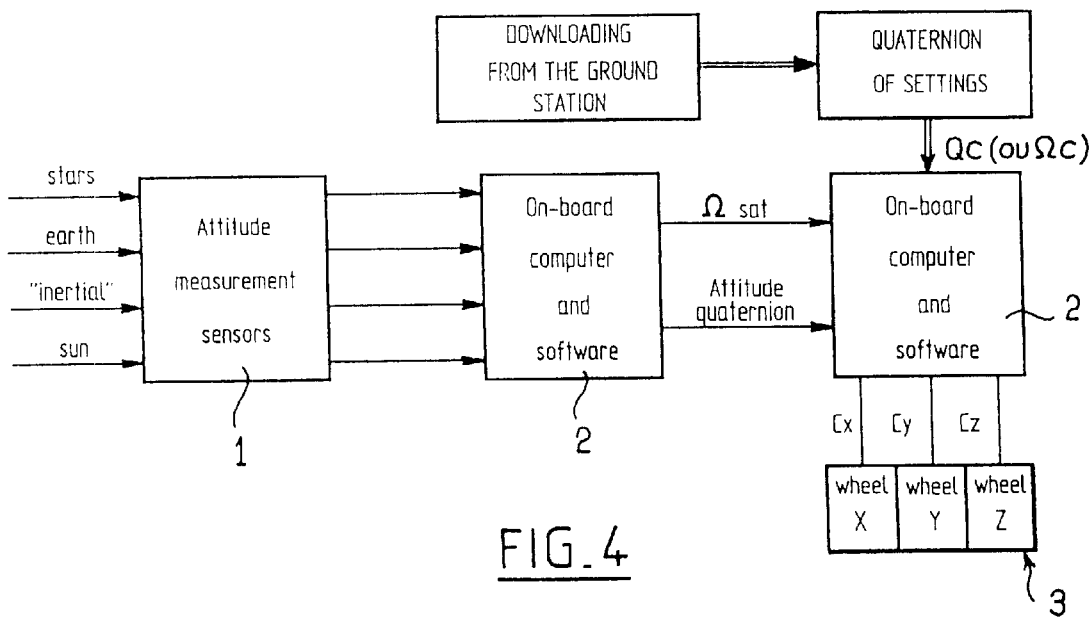

FIG. 4 illustrates the general case of the controller of a maneuvering satellite.

Attitude settings in the form of a guidance quaternion or absolute angular velocity of guidance of the satellite are calculated on the ground from attitude or velocity settings ($\phi c$, $\theta c$, $\psi c$, $\dot\phi c$, $\dot\theta c$ and $\dot\psi c$) calculated by the ground segment in order to carry out the desired samplings. The attitude control therefore executes these settings after downloading "attitude profiles" to the satellite, these taking the form of time-dependent quaternions or a time-dependent satellite absolute angular velocity setting (in general these are time-dependent polynomials).

Illustrated in FIG. 5 is an arrangement of arrays allowing advantageous implementation of the invention.

According to this arrangement, a plurality of arrays B of charge-coupled type is distributed in a sawtooth pattern in the focal plane of the earth observation instrument. These various arrays B are identical and parallel and distributed in line in the said focal plane.

The satellite is guided in terms of attitude in such a way that the inclination of the arrays with respect to the normal to the velocity of the satellite on the ground is equal to:

$$\alpha_{um} = \text{Arctg } Um$$

the ground speed satisfying the formulae given on page 3 (see FIG. 5), $V_{longi}$ and $V_{lateral}$ being parallel and perpendicular to the direction of the arrays B.

With such an arrangement it is only necessary to implement pitching control of the attitude of the satellite, and also possibly weak roll control in order to compensate for the effect of the rotation of the earth.

The acquisition carried out is therefore less expensive than that described with reference to the preceding figures.

Moreover, it will be noted that this arrangement allows greater efficiency of acquisition. In particular, for the same number of elementary detectors, it is possible with a plurality of parallel arrays to achieve images of larger rectangular areas on the ground than with a single array of detectors.

Moreover, it will be noted, as was illustrated in FIG. 6, that this technique makes it possible to use, to construct the arrays, arrays of integrated-circuit type, that is to say electronic chips, a technology which it is not possible to use in the case in which a one-piece array (with no special optic, of the DIVOLI type for example) must be arranged in the focal plane.

What is claimed is:

1. Process for acquiring an image by push-broom scanning from a satellite or aerial vehicle carrying at least one array of sensors of charge coupled type, characterized in that the attitude and the angular rates of roll, pitch and yaw of the vehicle are controlled so that the longitudinal and lateral ground speeds of the array satisfy $$V_{Longi} = \pm \frac{m}{m^2 + l^2} \cdot V_{ref}$$

$$V_{lateral} = \pm \frac{l}{m^2 + l^2} \cdot V_{ref}$$

where $V_{ref}=P/Ti$, P being the footprint of the array, Ti the sampling period, m being an integer and l being a nonzero integer.

2. Process according to claim 1, characterized in that the attitude of the vehicle is controlled by imposing a constant angle of yaw.

3. Process according to claim 1, characterized in that the attitude of the vehicle is controlled by varying the pitch angle and the angle of yaw.

4. Process according to claim 1, characterized in that the vehicle comprises a plurality of arrays arranged in parallel in a saw toothed pattern in the focal plane of an optic, the vehicle being guided in such a way that the inclination of the arrays with respect to the normal to the velocity of the satellite on the ground is equal to:

$$\alpha_{l/m} = \text{Arctan } 1/m.$$

5. Process according to claim 1, wherein l is positive.

* * * * *